US008806371B2

(12) United States Patent  (10) Patent No.: US 8,806,371 B2
Louch et al.  (45) Date of Patent: Aug. 12, 2014

(54) INTERFACE NAVIGATION TOOLS

(75) Inventors: John O. Louch, San Luis Obispo, CA (US); Timothy Wayne Bumgarner, Sharpsburg, MD (US); Eric Steven Peyton, Lisle, IL (US); Christopher Hynes, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 443 days.

(21) Appl. No.: 12/412,264

(22) Filed: Mar. 26, 2009

(65) Prior Publication Data

US 2010/0251170 A1    Sep. 30, 2010

(51) Int. Cl.
 *G06F 3/048* (2013.01)
(52) U.S. Cl.
 USPC .......................................... 715/810; 715/854
(58) Field of Classification Search
 USPC .................................................. 715/810, 854
 See application file for complete search history.

(56) References Cited

U.S. PATENT DOCUMENTS

| | | | |
|---|---|---|---|
| 6,266,059 B1 | 7/2001 | Mathews, III et al. | |
| 6,665,687 B1 | 12/2003 | Burke | |
| 7,203,701 B1 | 4/2007 | Packebush et al. | |
| 2003/0001907 A1* | 1/2003 | Bergsten et al. | 345/853 |
| 2005/0246663 A1* | 11/2005 | Yeung et al. | 715/851 |
| 2005/0257169 A1 | 11/2005 | Tu | |
| 2005/0289482 A1* | 12/2005 | Anthony et al. | 715/851 |
| 2006/0184894 A1* | 8/2006 | Daniels et al. | 715/783 |
| 2007/0083911 A1 | 4/2007 | Madden et al. | |
| 2007/0147178 A1 | 6/2007 | Masuda et al. | |
| 2007/0189737 A1 | 8/2007 | Chaudhri et al. | |
| 2007/0222768 A1* | 9/2007 | Geurts et al. | 345/173 |
| 2009/0187824 A1 | 7/2009 | Hinckley et al. | |
| 2009/0187864 A1* | 7/2009 | Bedell et al. | 715/854 |

OTHER PUBLICATIONS

Authorized Officer Bruno Gamboa Susin, Notification of Transmittal of the International Search Report and the Written Opinion of the International Searching Authority, or Declaration for Application No. PCTUS2010/028503, dated Jul. 16, 2010, 11 pages.
Office action issued in Chinese Patent Application No. 201080013938.7 on Jan. 24, 2013, 10 pages.
Office action issued in Great Britain Patent Application GB1116583.4 on May 21, 2013, 4 pages.
Office action issued in Great Britain Patent Application GB1116583.4 on Oct. 16, 2013, 4 pages.
Office action issued in Chinese Patent application 201080013938.7 on Sep. 24, 2013, 26 pages.
Authorized Officer Simin Baharlou, International Preliminary Report on Patentability issued in international Application No. PCTUS2010/028503, dated Sep. 27, 2011, 7 pages.

* cited by examiner

*Primary Examiner* — Peiyong Weng
(74) *Attorney, Agent, or Firm* — Fish & Richardson P.C.

(57) ABSTRACT

Navigation tools for an interface (e.g., a graphical user interface) are disclosed. In one aspect, a first stack item (e.g., a first directory) that includes one or more stack elements (e.g., subdirectories) is presented in the interface. User input selecting one of the one or more stack elements causes a scaled version of the first stack item (e.g., a smaller visual representation of the directory) and a second stack item (e.g., a selected subdirectory) that corresponds to the selected stack element to be presented in the interface. Selecting the scaled version of the first stack item causes the first stack item to be presented (e.g., a larger visual representation of the directory) in the interface.

15 Claims, 11 Drawing Sheets

INTERFACE NAVIGATION TOOLS

TECHNICAL FIELD

This subject matter is generally related to user interface tools for electronic devices.

BACKGROUND

Traditional user interfaces (e.g., graphical user interfaces) allow a user to navigate through objects with a hierarchy. For example, a user can navigate through different file system objects (e.g., file directories or folders) in a file system. Users commonly access file subdirectories nested within a root file directory. As the depth of an accessed subdirectory within a root directory increases, the difficulty of identifying the contents of each directory between the accessed subdirectory and the root directory (e.g., a parent directory, a grandparent directory) may increase. As a result, an efficiency of using a traditional user interface for navigating through the file system may decrease.

In addition, traditional user interfaces may not provide an efficient interface for navigating between objects that may be related by other hierarchies (e.g., less traditional hierarchies). For example, activating a text document may result in the contents of the text document being displayed in a word processing application. Navigating back to a previous hierarchy (e.g., the text document in the file system) from the contents of the text document displayed in the word processing application can become more difficult as a number of interface windows in the user interface increases.

SUMMARY

Navigation tools for an interface (e.g., a graphical user interface) are disclosed. In one aspect, a first stack item (e.g., a first directory) that includes one or more stack elements (e.g., subdirectories) is presented in the interface. User input selecting one of the one or more stack elements causes a scaled version of the first stack item (e.g., a smaller visual representation of the directory) and a second stack item (e.g., a selected subdirectory) that corresponds to the selected stack element to be presented in the interface. Selecting the scaled version of the first stack item causes the first stack item to be presented (e.g., a larger visual representation of the directory) in the interface.

Particular embodiments of the subject matter described in this specification can be implemented to realize one or more of the following advantages. Providing a visual representation of a first stack item (e.g., a first directory) and stack elements (e.g., subdirectories) that the first stack item includes, in combination with a visual representation of a second stack item (e.g., a child directory of the first directory) provides a user relevant context (e.g., a current location in the file system hierarchy, and contents of parent directories) that allows the user to navigate between stack items and stack elements more efficiently.

For example, presenting a scaled visual representation of the first directory (e.g., a smaller representation) that can be used like a back button, along with the child directory of the first directory, provides detailed context that shows a hierarchical relationship of the two stack items. Furthermore, animations can be used to present the child directory as coming out of the first directory, or going into the first directory, to further enhance the contextual representation of the hierarchical relationship to the user.

Providing the user context in this manner also provides a more organized and efficient use of space (e.g., desktop real estate) in a graphical user interface, for example. As a result, the user's experience is improved.

DESCRIPTION OF DRAWINGS

Like reference numbers and designations in the various drawings indicate like elements.

DETAILED DESCRIPTION

Figure 1:
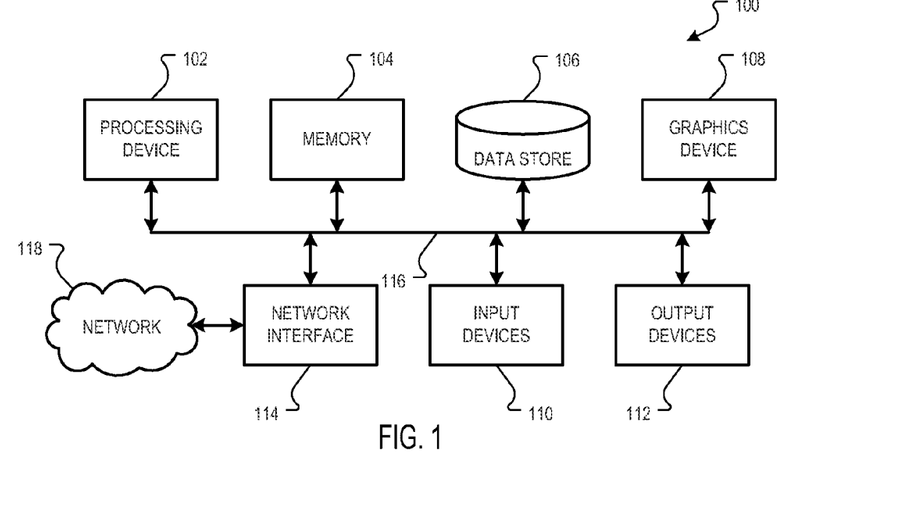
FIG. 1 is a block diagram of an example system that can be utilized to implement the systems and methods described herein.

FIG. 1 is a block diagram of an example system 100 that can be utilized to implement the systems and methods described herein. The system 100 can, for example, be implemented in a computer device, such as any one of the personal computer devices available from Apple Inc., or other electronic devices. Other example implementations can also include video processing devices, multimedia processing devices, portable computing devices, portable communication devices, set top boxes, and other electronic devices.

The example system 100 includes a processing device 102, a first data store (e.g., memory 104), a second data store 106, a graphics device 108, input devices 110, output devices 112, and a network device 114. A bus system 116, such as a data bus and a motherboard, can be used to establish and control data communication between the components 102, 104, 106, 108, 110, 112 and 114. Other example system architectures, however, can also be used.

The processing device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

The graphics device 108 can, for example, include a video card, a graphics accelerator card, or a display adapter, and is configured to generate and output images to a display device. In one implementation, the graphics device 108 can be realized in a dedicated hardware card connected to the bus system 116. In another implementation, the graphics device 108 can be realized in a graphics controller integrated into a chipset of the bus system 116. Other implementations can also be used.

Example input devices 110 can include a keyboard, a mouse, a stylus, a video camera, a multi-touch surface, etc., and example output devices 112 can include a display device, an audio device, etc.

The network interface 114 can, for example, include a wired or wireless network device operable to communicate data to and from a network 118. The network 118 can include one or more local area networks (LANs) or a wide area network (WAN), such as the Internet.

In an implementation, the system 100 includes instructions defining an operating system stored in the first data store 104 and/or the second data store 106. Example operating systems can include the MAC OS® X series operating system, the WINDOWS® based operating system, or other operating systems. Upon execution of the operating system instructions, access to various system objects is enabled. Example system objects include data files, applications, functions, windows, etc. To facilitate an intuitive user experience, the system 100 includes a graphical user interface that provides the user access to the various system objects and conveys information about the system 100 to the user in an intuitive manner.

Figure 2:
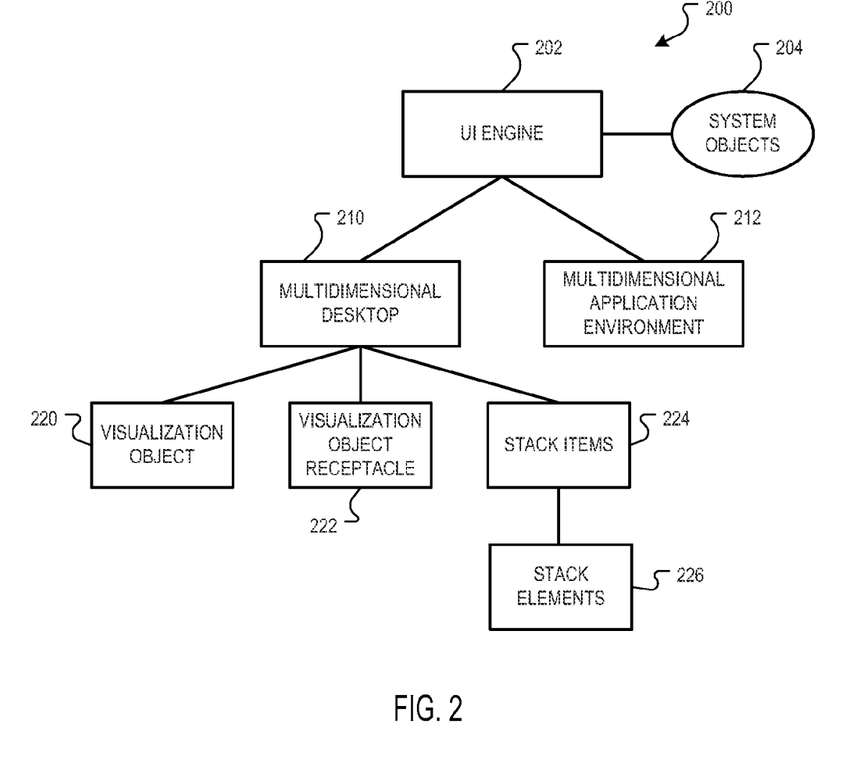
FIG. 2 is a block diagram of an example user interface architecture.

FIG. 2 is a block diagram of an example user interface architecture 200. The user interface architecture 200 includes a user interface (UI) engine 202 that provides the user access to the various system objects 204 and conveys information about the system 100 to the user.

Upon execution, the UI engine 202 can cause the graphics device 108 to generate a graphical user interface on an output device 112, such as a display device. In one implementation, the graphical user interface can include a multidimensional desktop 210 and a multidimensional application environment 212. In an implementation, the multidimensional desktop 210 and the multidimensional application environment 212 include x-, y- and z-axis aspects, e.g., a height, width and depth aspect. The x-, y- and z-axis aspects may define a three-dimensional environment, e.g., a "3D" or "2.5D" environment that includes a z-axis, e.g., depth, aspect.

In an implementation, the multidimensional desktop 210 can include user interface elements, such as visualization objects 220, a visualization object receptacle 222, and stack items 224. Each of the stack items 224 can be associated with one or more stack elements 226, as will be described in further detail below. In some implementations, the visualization objects 220, the visualization object receptacle 222, the stack items 224, and the stack elements 226 can be presented in a pseudo-three dimensional (i.e., "2.5D") or a three-dimensional environment as graphical objects having a depth aspect. The stack items and stack elements can be represented in two dimensions or three dimensions.

A visualization object 220 can, for example, be a visual representation of a system object. In some implementations, the visualization objects 220 are icons. Other visualization objects can also be used, e.g., alert notification windows, menu command bars, windows, or other visual representations of system objects.

In an implementation, the multidimensional application environment 212 can include an application environment distributed along a depth aspect. For example, a content frame, e.g., an application window, can be presented on a first surface, and control elements, e.g., toolbar commands, can be presented on a second surface.

Figure 3A:
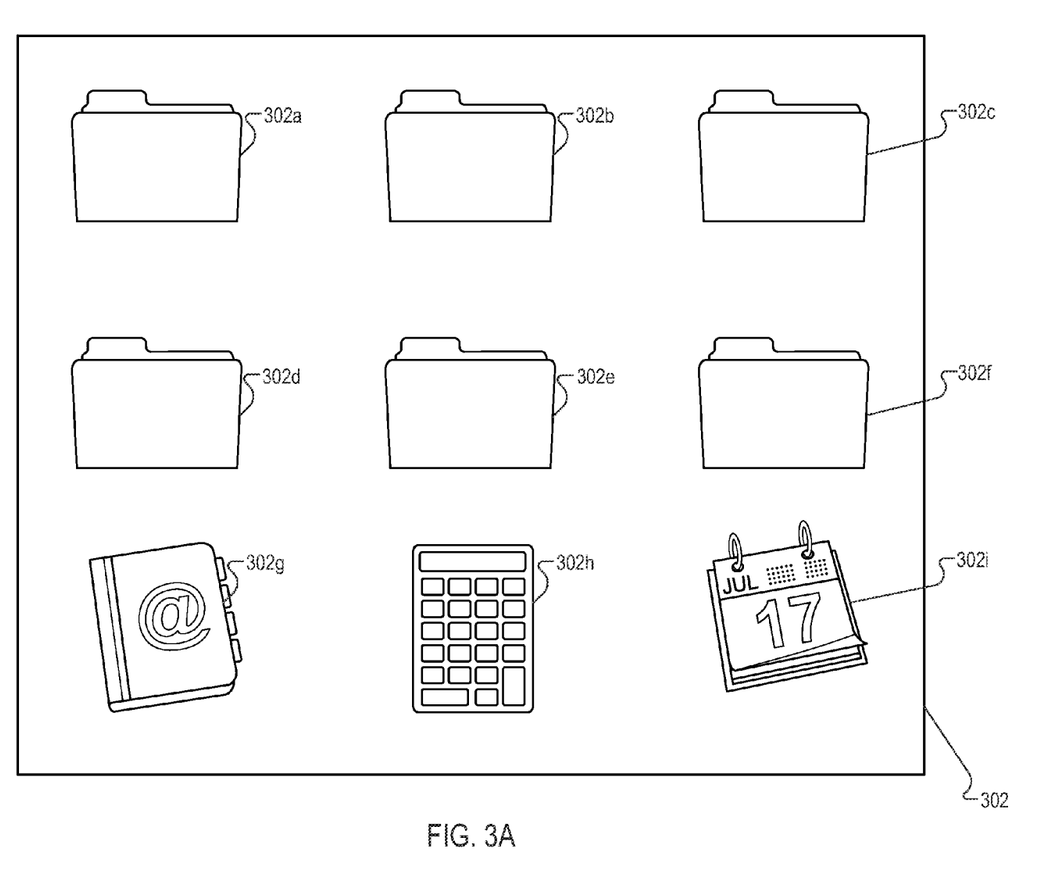
FIG. 3A is a block diagram depicting an example first visual representation of a first stack item.

FIG. 3A is a block diagram depicting an example first visual representation 302 of a first stack item, e.g., in a first state. In some implementations, the first stack item is a system object that includes one or more stack elements, e.g., stack elements 302a-i, such as icons corresponding to system objects, or other visualizations of system objects. The first stack item is associated with the stack elements 302a-i so that selection of the first stack item can provide access to any of the stack elements 302a-i and their corresponding system objects. In some implementations, a stack element can be realized by a corresponding visualization object of a system object. In some implementations, a stack element can be realized by a corresponding thumbnail icon of a system object. In some implementations, a stack element can be realized by a different corresponding icon of a system object. In some implementations, a stack element can be realized by a common stack element icon. Other stack element realizations with icons and/or other visualization objects can also be used.

In some implementations, the stack elements 302a-i are aggregated in a tiled arrangement as shown in FIG. 3A. Other stack arrangements can also be used. In some implementations, each of the stack elements 302a-i displays a corresponding unique indicium, e.g., a thumbnail preview of an image associated with the respective stack element, the first page of a document associated with the respective stack element, documents included in a file directory associated with the respective stack element. Other unique indicium or unique indicia can also be used. For example, stack elements corresponding to images can be of the same aspect of the image, e.g., a 4×5 aspect, and 9×12 aspect, etc. Likewise, stack items corresponding to documents can be of the same aspect of a paper selection, e.g., an 8.5×11 aspect, an A4 aspect, etc. Other unique indicium or indicia can also be used, e.g., a document size and/or a document date can be displayed in each stack element, etc.

In some implementations, the stack elements 302a-i can be normalized to or in a similar display aspect. For example, stack elements corresponding to images of different aspects, e.g., a 4×5 aspect, and 9×12 aspect, etc., can be of the same display aspect by the addition of borders surrounding a thumbnail of the thumbnail image. Such normalization can facilitate a consistent presentation of system objects having inconsistent characteristics, e.g., different formatting sizes.

The first stack item can include visualization objects related to different types of system objects. For example, a stack item can include stack elements related to peripheral devices, e.g., hard drives, universal serial bus devices, etc.; or can include stack elements related to application windows; or can include stack elements related to system functions, e.g., menus, a shutdown function, a sleep function, a backup function, etc.; or can includes stack elements related to recent system alerts; or other system objects.

In some implementations, the first stack item can include visualization objects related to different system views. For example, stack element 302a can correspond to a work environment; stack element 302b can correspond to a gaming environment; stack element 302c can correspond to a music environment; and the stack element 302d can correspond to a movie environment. Selection of any of the corresponding elements 302a-d, for example, can cause the user interface to transition to the corresponding environment.

In some implementations, the first stack item can include visualization objects related to multiple monitors. For example, if a monitor in a dual monitor user environment is disabled, the corresponding visualization objects displayed on the disabled monitor can collapse into a monitor stack on the remaining monitor.

Other implementations of stack items and stack elements are possible as described in further detail below. For example, each of the stack elements 302a-i can correspond to another stack item. Selection of any of the stack elements 302a-i can cause the user interface to display stack items that correspond to the selected stack elements.

Figure 3B:
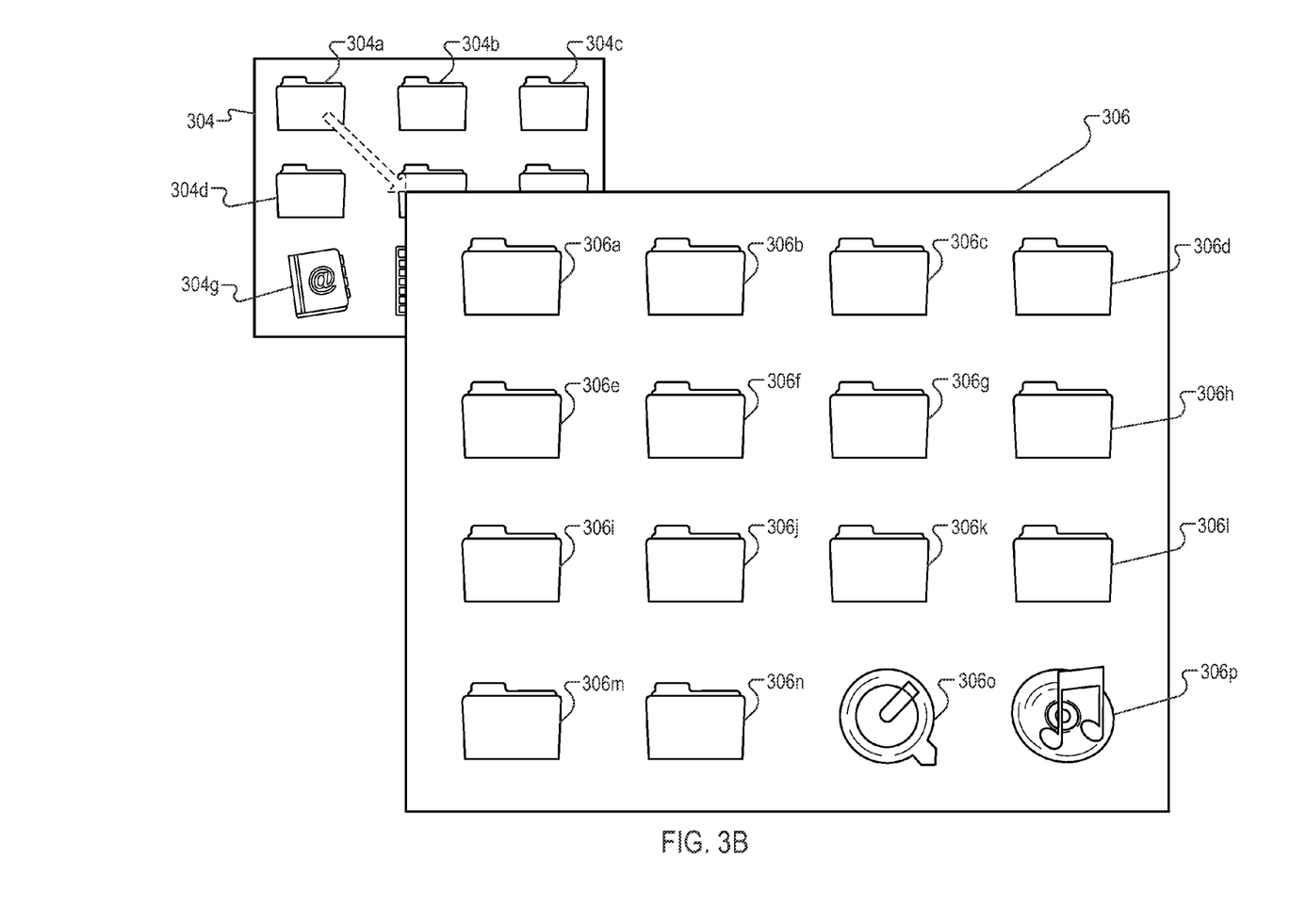
FIG. 3B is a block diagram depicting an example second visual representation of the first stack item, and a first visual representation of a second stack item.

FIG. 3B is a block diagram depicting an example second visual representation 304 of the first stack item, and a first visual representation 306 of a second stack item, e.g., in a second state. In response to a selection of a stack element, e.g., stack element 302a, in the first visual representation 302 of the first stack item, the user interface can generate a second visual representation 304 of the first stack item. Stack element 302a in the first visual representation 302 of the first stack item corresponds to stack element 304a in the second visual representation 304 of the first stack item. In particular, stack element 302a and stack element 304a can correspond to a same system object.

The second visual representation 304 of the first stack item provides a user relevant context (e.g., a visual representation of a parent directory and its included subdirectories), so that the user can navigate back to the first stack item (e.g., the parent directory) while knowing what the first stack item includes and from where the second stack item (e.g., a subdirectory) originated. The second visual representation 304 can be considered to have the function of a back button, that provides a contextual representation of the hierarchical relationship between the first stack item and the second stack item, and allows a user to navigate to a previous hierarchy (e.g., the first stack item) from a current hierarchy (e.g., the second stack item). An example of a previous hierarchy is a parent directory of a child directory. Another example of navigating to a previous hierarchy is navigating back to a text document in a file system (e.g., a parent object) from the contents of the text document displayed in a word processing application (e.g., a child object).

In some implementations, when stack element 302a is selected, the second visual representation 304 of the first stack item and the first visual representation 306 of the second stack item can be combined for display in the interface through animations. The first visual representation 302 of the first stack item can be animated, in a first animation, such that it transforms into the second visual representation 304 of the first stack item. In addition, the first visual representation 306 of the second stack item can be presented through a second animation showing the first visual representation 306 coming out of the stack element 304a, as indicated by the arrow. Examples of this type of animation include the first visual representation 306 "fanning out", "flying out", or "popping out" of stack element 304a. In some implementations, the first animation completes before the second animation begins. In some implementations, the first animation and second animation can occur simultaneously or partially overlap in time (e.g., through cross-fading).

In some implementations, the second visual representation 304 of the first stack item is a scaled version (e.g., a smaller representation) of the first visual representation 302 of the first stack item. The second visual representation 304 of the first stack item can be of the same aspect ratio as the first visual representation 302 of the first stack item. As shown in FIG. 3B, the first visual representation 302 of the second stack item and the second visual representation 304 of the first stack item are displayed in parallel planes. In some implementations, the second visual representation 304 of the first stack item can be displayed at an angle relative to the first visual representation 306 of the second stack item. In particular, the second visual representation 304 of the first stack item can be rotated back (e.g., through animation) in three-dimensional space to illustrate that the second visual representation 304 of the first stack item is behind the first visual representation 306 in three-dimensional space and moving backwards, e.g., to create an illusion that the second visual representation 304 is moving away from the user and deeper into the graphical user interface. The second visual representation 304 of the first stack item can brought to rest in a plane that, if projected, would intersect with the plane that the first visual representation 306 of the second stack item is displayed within.

Other implementations are possible. For example, as shown in FIG. 3B, the first visual representation 306 of the second stack item and the second visual representation 304 of the first stack item are displayed in an overlapping arrangement. As another example, the first visual representation 306 of the second stack item and the second visual representation 304 of the first stack item can be displayed such that the visual representations do not overlap (e.g., in a tiled arrangement).

Furthermore, the second visual representation 304 of the first stack item can include an indicator (not shown). The indicator can be used to identify that the second stack item, represented by the first visual representation 306, is a stack item that corresponds to the stack element 304a (which corresponds to stack element 302a that is currently selected). The indicator can be visually represented in various implementations. For example, the indicator can be represented by shading of the stack element 304a. As another example, the indicator can be represented by a border (e.g., highlighting) around the stack element 304a. As another example, the representation of stack element 304a can be modified such that it is 2.5D, 3D, or animated.

In addition, the stack element 304a and first visual representation 306 of the second stack item can each be presented with text that identifies each as related to the other. For example, stack element 304a can correspond to a directory of images, and the stack elements 306a-p can be images. The text "Party Photos", for example, can be displayed with the second visual representation 304 of the first stack item and the first visual representation 306 of the second stack item. Other implementations are possible.

Figure 3C:
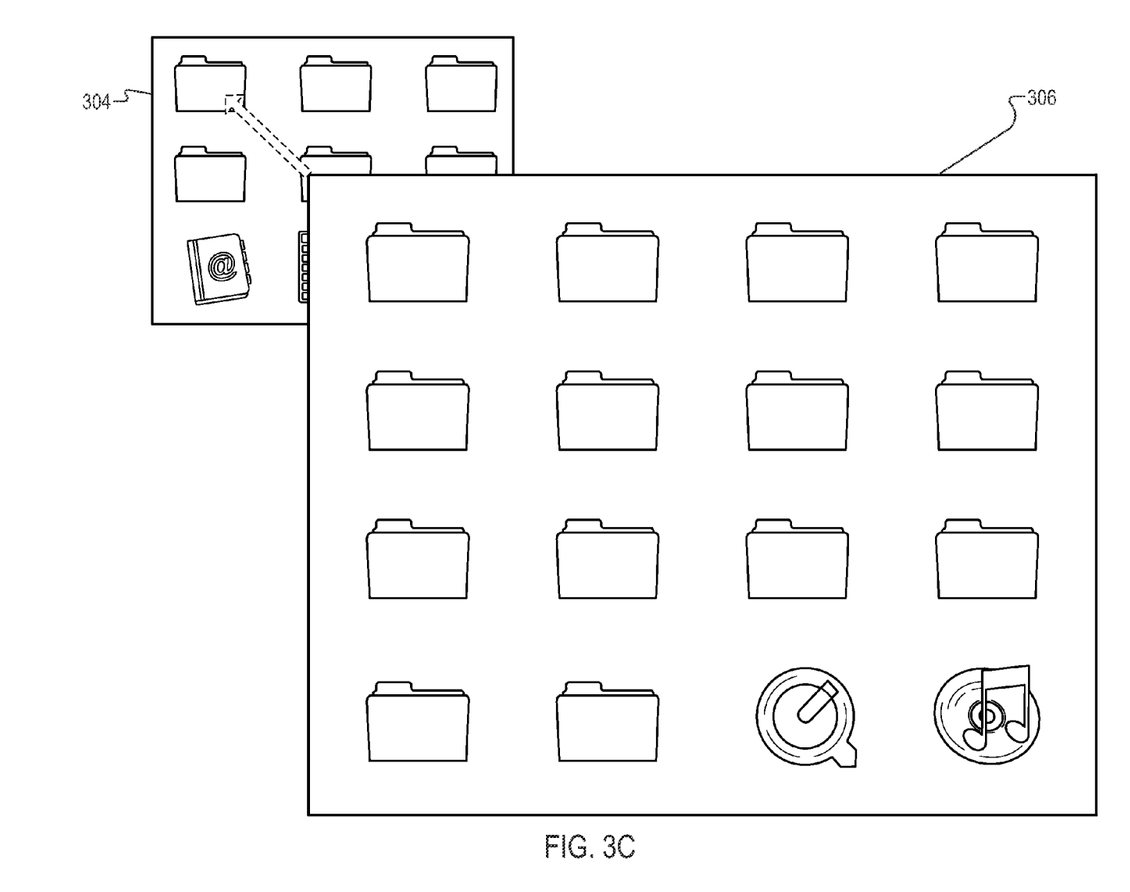
FIG. 3C is a block diagram depicting an example second visual representation of the first stack item, and the first visual representation of the second stack item.

FIG. 3C is a block diagram depicting the example second visual representation 304 of the first stack item, and the first visual representation 306 of the second stack item, e.g., in a third state. Selecting the second visual representation 304 of the first stack item allows a user to return focus to the first visual representation 302 of the first stack item. In some implementations, when the second visual representation 304 is selected, animations can be presented in the user interface.

The animations can be the reverse of the animations (e.g., reverse animations) described with reference to FIG. 3B. In particular, the second visual representation 304 of the first stack item can be animated, in a first animation, such that it transforms into the first visual representation 302 of the first stack item. In addition, the first visual representation 306 of the second stack item can be removed from display through a second animation showing the first visual representation 306 of the second stack item going into the stack element 304a, as indicated by the arrow. Examples of this type of animation include the first visual representation 306 of the second stack item "fanning into", "flying into", or "popping into" the stack element 304a. In some implementations, the second animation completes before the first animation begins. In some implementations, the first animation and second animation can occur simultaneously or partially overlap in time. As a result, the first visual representation 302 of the first stack item comes into focus on the user interface, such as in the depiction in FIG. 3A.

The animations described can be implemented using a visualization model that defines a multi-dimensional path that includes one or more terminuses. For example, the first visual representation 302 of the first stack item can be initially disposed at a first terminus, e.g., as shown in FIG. 3A. The second visual representation 304 of the first stack item can be disposed at a second terminus, e.g., as shown in FIG. 3B. The first visual representation 302 of the first stack item can be disposed at the first terminus, in response to a selection of the second visual representation 304, e.g., as shown in FIG. 3A. The first terminus is not necessarily located at a same position in the user interface for each animation. Similarly, the second terminus is not necessarily located at a same position in the user interface for each animation.

Temporarily referring to FIG. 3B, selecting a stack element (e.g., 306e) from the first visual representation 306 of the second stack item can result in the display of a first visual representation of a third stack item.

Figure 3D:
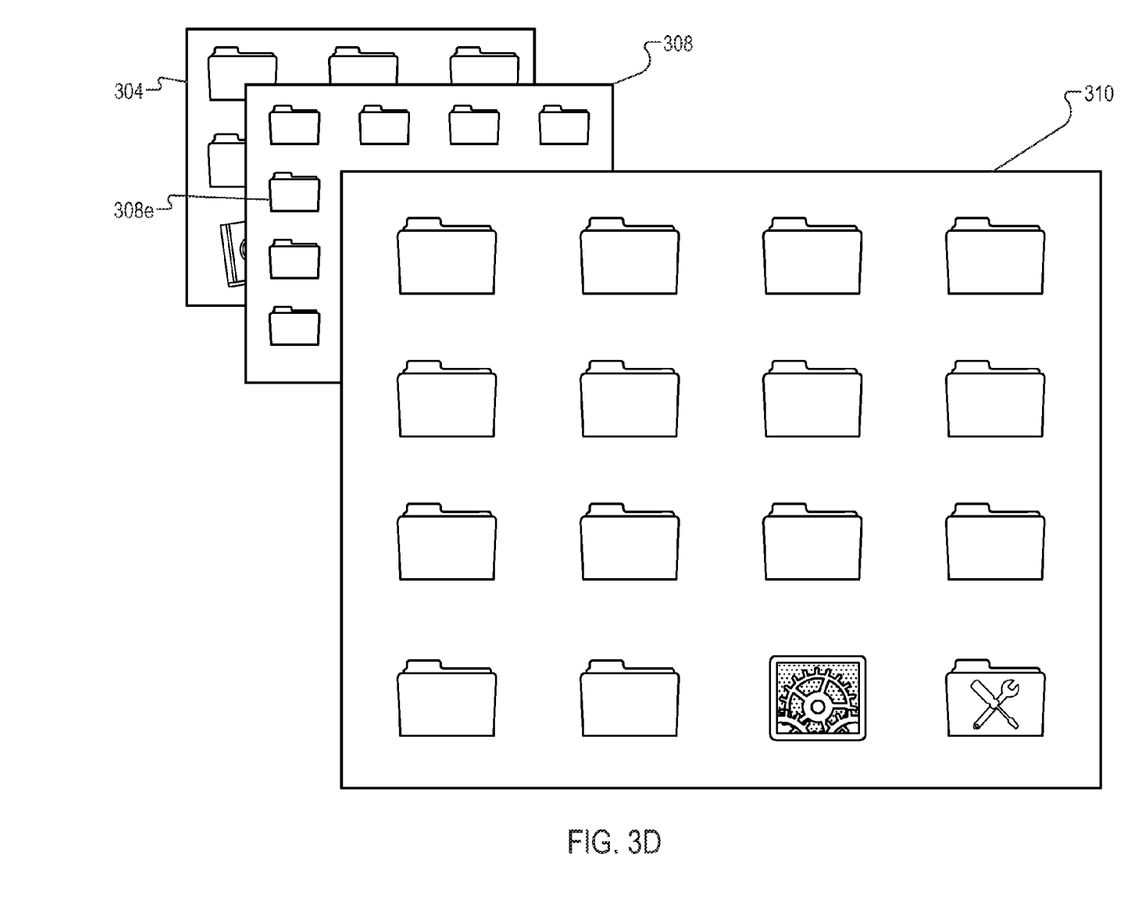
FIG. 3D is a block diagram depicting the example second visual representation of the first stack item, an example second visual representation of the second stack item, and an example first visual representation of a third stack item.

FIG. 3D is a block diagram depicting the example second visual representation 304 of the first stack item, an example second visual representation 308 of the second stack item, and an example first visual representation 310 of a third stack item. In particular, the third stack item can correspond to the stack element 306e. A user can interact with the first visual representation 310 of the third stack item and the second visual representation 308 of the second stack item in a similar manner as described with respect to FIGS. 3A-3C.

The second visual representation 304 of the first stack item and the second visual representation 308 of the second stack item provide the user relevant context. For example, if the third stack item is a directory, the first stack item and second stack item are grandparent and parent directories, respectively. The user can navigate back to the first stack item or the second stack item while knowing what the first stack item and second stack item includes and from where the third stack item originated.

In some implementations, selecting the second visual representation 304 of the first stack item can result in the first visual representation 310 of the third stack item going into the stack element 308e of the second stack item, and the second visual representation 308 of the second stack item going into the stack element 304a of the first stack item. As a result, the first visual representation 302 of the first stack item comes into focus on the user interface, such as shown in FIG. 3A. Other implementations are possible. For example, the first visual representation 310 of the third stack item and the second visual representation 308 of the second stack item can both be animated as going into stack element 304a.

In addition, as described previously, the second visual representation 304 of the first stack item and the second visual representation 308 of the second stack item can be displayed at an angle. For example, the second visual representation 304 can be displayed in a first plane that, if projected, would intersect with a second plane that the first visual representation 310 is displayed within. The second visual representation 308 can be displayed in a third plane that is parallel to the first plane.

Figure 3E:
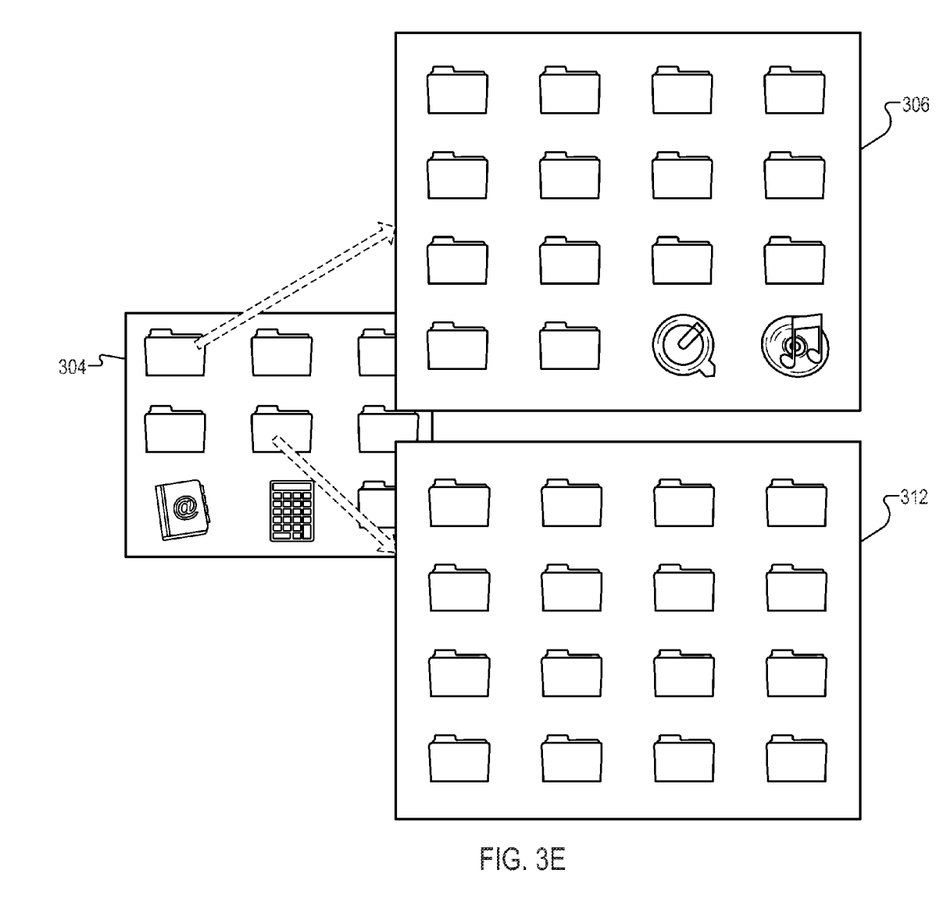
FIG. 3E is a block diagram depicting the example second visual representation of the first stack item, the example first visual representation of the second stack item, and an example first visual representation of a fourth stack item.

FIG. 3E is a block diagram depicting the example second visual representation 304 of the first stack item, the example first visual representation 306 of the second stack item, and an example first visual representation 312 of a fourth stack item. As shown in FIG. 3E, selecting stack items 304a and 304e simultaneously, for example, can cause a first visual representation 306 of the second stack item (e.g., that corresponds to stack item 304a) to be presented simultaneously with the first visual representation 312 of a fourth stack item (e.g., that corresponds to stack item 304e). In addition, more than two stack elements can be selected to display corresponding visual representations of stack items.

Other implementations are possible. For example, two or more unrelated stack items can be presented simultaneously in the user interface. The stack items can be considered as unrelated because they are independent nested structures, e.g., where additional stack elements and stack items that can be accessed through each of the unrelated stack items are unique.

As another example, a predetermined input (e.g., an angled gesture, or a gesture along a horizontal plane of the stack items) received through the back button can result in the display of one or more back buttons that were previously generated for the user. For example, all the back buttons generated for the user can be stored in a history in memory. In some implementations, if all the back buttons cannot be displayed in the interface at once, the back buttons can be further scaled. Other implementations are possible. Scrollbars can be generated and presented to allow a user to navigate among the history of back buttons. In addition, an interface like Cover Flow for Mac OS X can be used to display the back buttons. In some implementations, clicking and holding a cursor over the back button can result in a list of back buttons being displayed, like a menu. The user can move the cursor, while holding the click to navigate among the list of back buttons. In some implementations, the list of back buttons can be presented through an animation, e.g., where the list of back buttons slide out from a current back button. In addition, other types of predetermined inputs can be used to show and hide the list of back buttons. For example, pressing an option key on a keyboard while hovering a cursor over the current back button can result in display of the list of back buttons. Furthermore, releasing the option key can result in hiding the list of back buttons.

In some implementations, the back button can indicate its ability to provide navigation among stack items. For example, as a user moves a cursor over the back button (e.g., hovering over the back button), the back button can be highlighted. As another example, descriptive text (e.g., "Go back", "Go back to Address Book") or an icon can be presented that indicates to the user that selecting the back button will return user focus to a particular object (e.g., Address Book).

In some implementations, animations can be used to indicate to the user that a stack item that a user has selected is in the process of activating or opening. For example, a spinning cursor or clock can be presented in the user interface. As another example, the visual representation selected by the user can be animated to create an illusion that it is "pulsing" (e.g., through changes in color, or size). In some implementations, an interface element (e.g., a window) can be displayed that indicates that the stack item is "loading" by displaying the text "loading", for example. As objects load, they can be presented in the interface element, and the size of the interface element can automatically adjust to accommodate display of the loading objects.

In some implementations, the back button is not a scaled representation of its corresponding stack item.

Figure 4A:
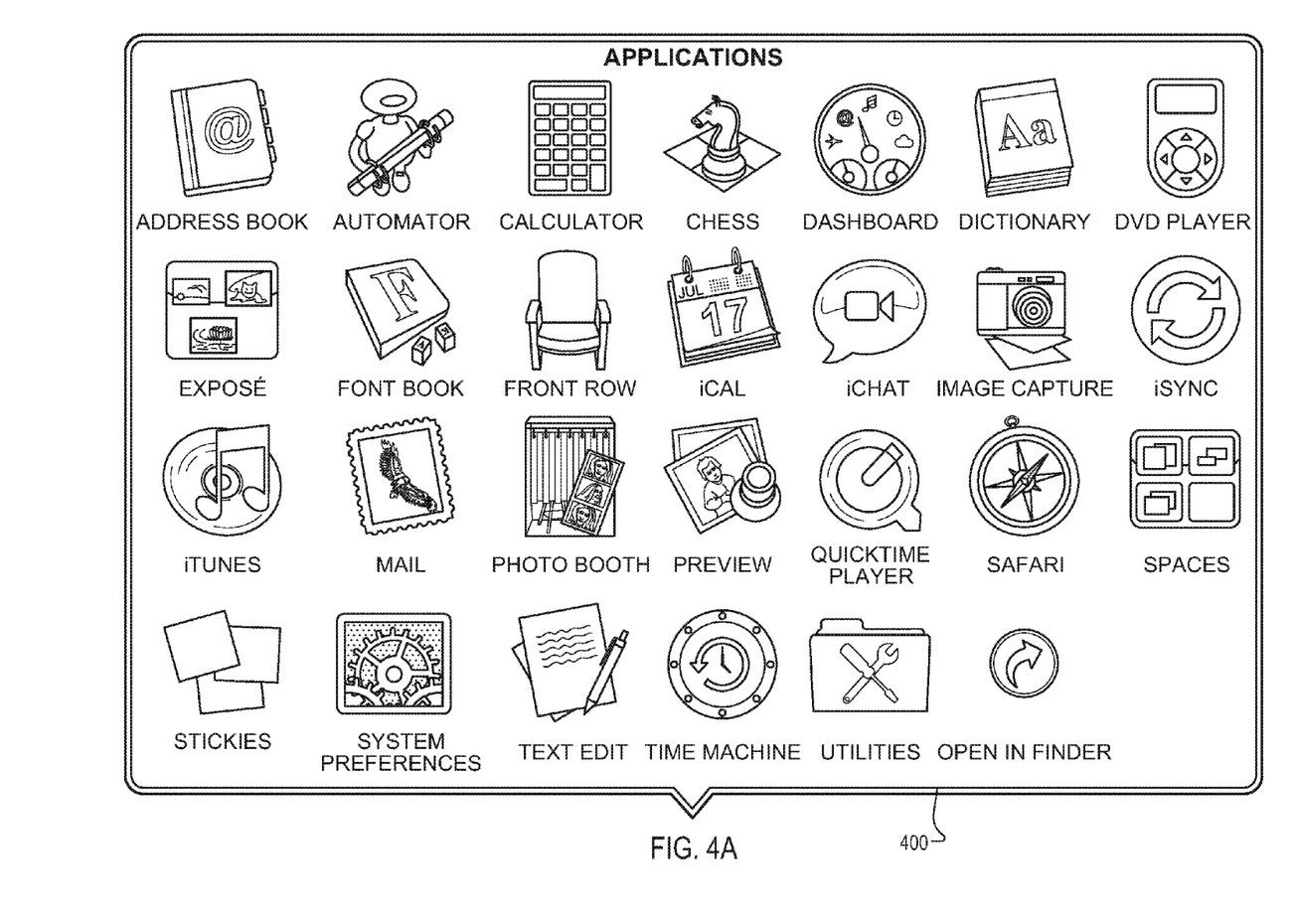
FIG. 4A is a screenshot that includes an example first visual representation of a stack item that includes application icons.
Figure 4B:
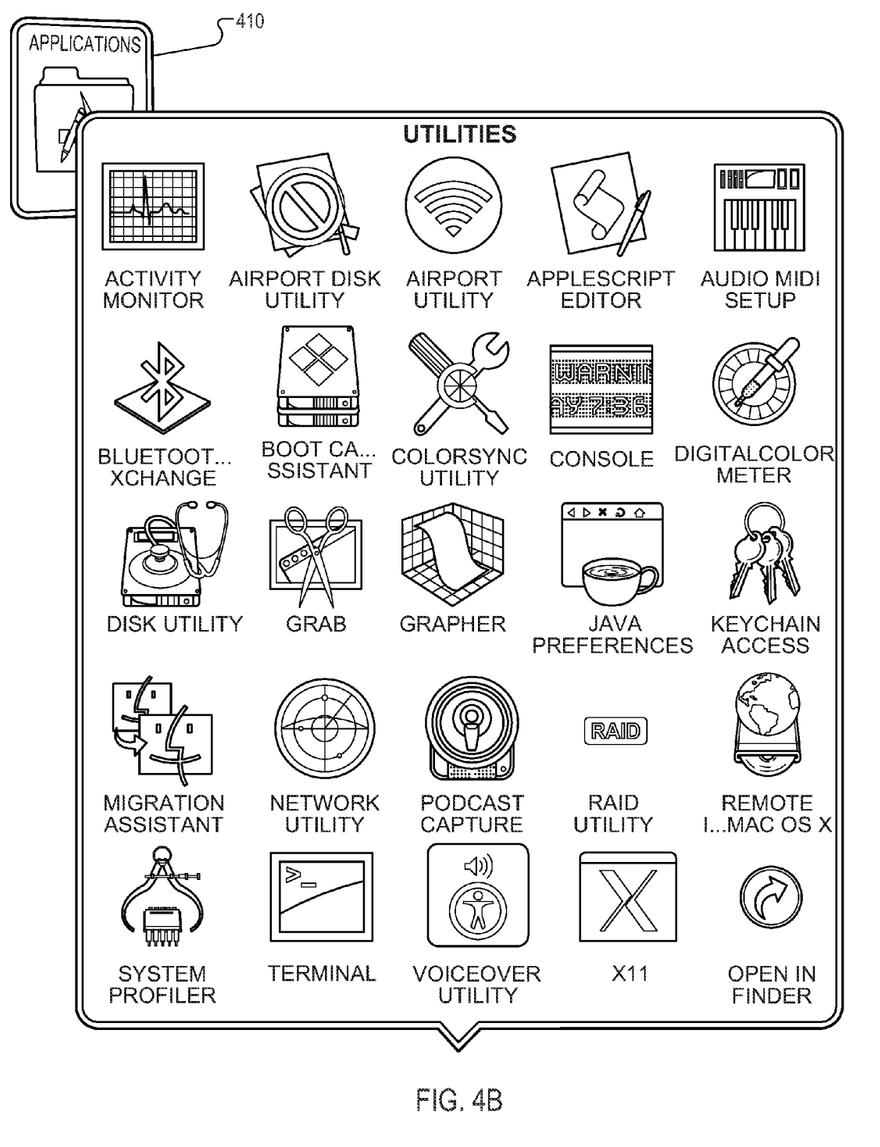
FIG. 4B is a screenshot that includes an example second visual representation of the stack item of FIG. 4A.

FIG. 4A is a screenshot that includes an example first visual representation 400 of a stack item that includes application icons. FIG. 4B is a screenshot that includes an example second visual representation 410 of the stack item of FIG. 4A. As shown in FIG. 4B, the second visual representation 410 of the stack item of FIG. 4A is not a scaled version of the first visual representation 400. The second visual representation 410 is a representation of a previous hierarchy, or a previous-hierarchy representation. In particular, the representation of the previous hierarchy includes an "Applications" icon that indicates that the previous hierarchy was a group of application icons. Other implementations are possible.

Figure 5:
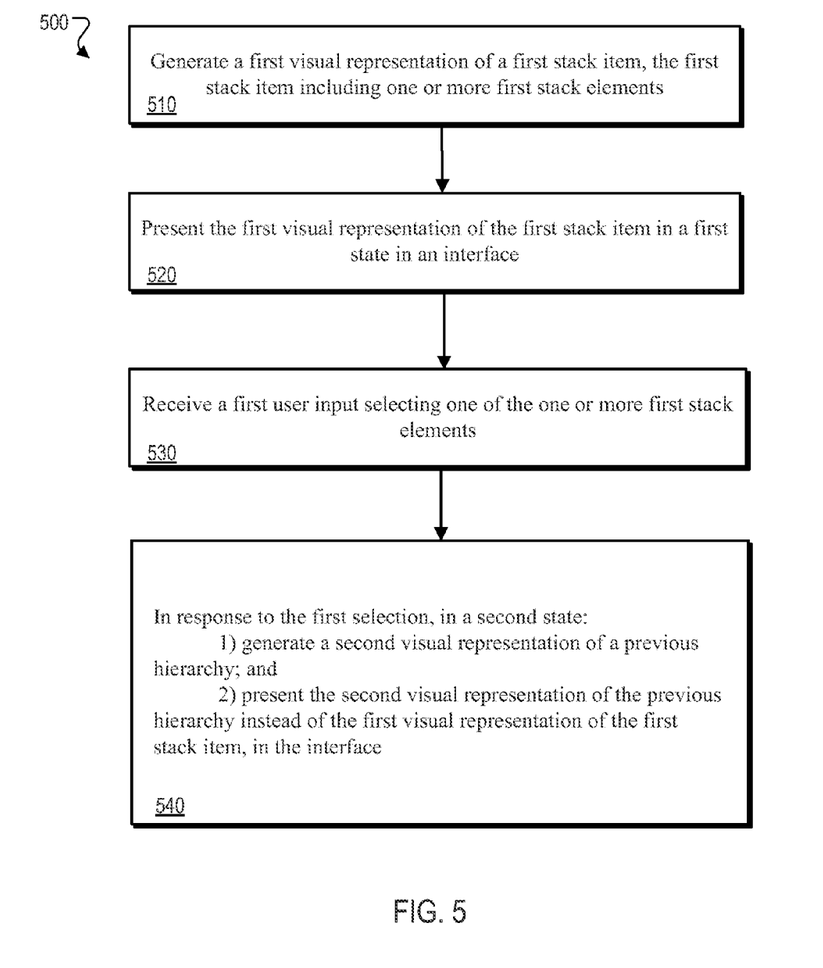
FIG. 5 is a flow diagram of an example process for generating stack items.

FIG. 5 is a flow diagram of an example process 500 for generating stack items. The process 500 includes generating 510 a first visual representation of a first stack item, the first stack item including one or more first stack elements. The process 500 also includes presenting 520 the first visual representation of the first stack item in a first state in an interface. For example, the UI engine 202 can generate and present a first visual representation of a first stack item in the multidimensional desktop 210. The process 500 also includes receiving 530 a first user input selecting one of the one or more first stack elements. For example, the first user input can be received through input devices 110. The process 500 also includes, in response to the first selection, in a second state: generating 540 a second visual representation of a previous hierarchy, and presenting the second visual representation of the previous hierarchy instead of the first visual representation of the first stack item, in the interface. The second visual representation of the previous hierarchy is a contextual representation of a hierarchy of the first stack item. For example, the UI engine 202 can generate and present the second visual representation of the previous hierarchy in the multidimensional desktop 210. The first visual representation of the first stack item is presented in the interface and the second visual representation of the previous hierarchy is removed from display in the interface, in a third state in response to a second user input selecting the second visual representation of the previous hierarchy. For example, the UI engine 202 can present the first visual representation of the first stack item and remove the second visual representation of the previous hierarchy from display in the multidimensional desktop 210, in response to a second user input received through the input devices 110.

Figure 6:
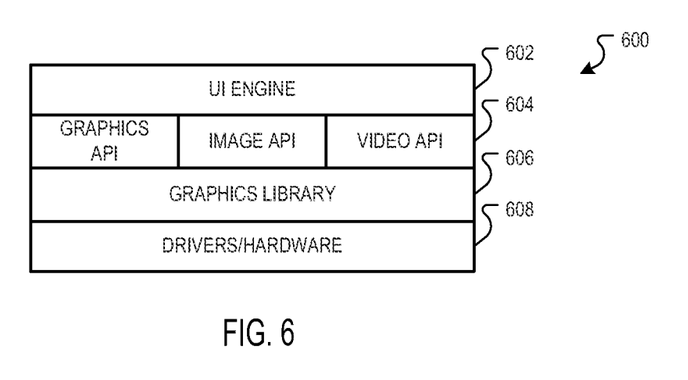
FIG. 6 is a block diagram of an example system layer structure that can be utilized to implement the systems and methods described herein.

FIG. 6 is a block diagram of an example system layer structure 600 that can be utilized to implement the systems and methods described herein. Other system layer implementations, however, can also be used.

In some implementations, a user interface engine, such as the UI engine 202, or another UI engine capable of generating a three-dimensional user interface environment, operates at an application level 602 and implements graphical functions and features available through an application program interface (API) layer 604. Example graphical functions and features include graphical processing, supported by a graphics API, image processing, support by an imaging API, and video processing, supported by a video API.

The API layer 604, in turn, interfaces with a graphics library layer 606. The graphics library layer 604 can, for example, be implemented as a software interface to graphics hardware, such as an implementation of the OpenGL specification. A driver/hardware layer 608 includes drivers and associated graphics hardware, such as a graphics card and associated drivers.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
presenting a visual representation of a directory level of a file directory hierarchy in an interface, the visual representation of the directory level including a first element representing a first subdirectory level of the file directory hierarchy and a second element representing a second subdirectory level of the file directory hierarchy, where the first and second subdirectory levels are at the same level in the file directory hierarchy; and
in response to selection of the first element and then the second element:
displaying visual representations of the first and second subdirectory levels together with a scaled version of the visual representation of the directory level, where the visual representations of the first and second subdirectory levels are displayed at a different size and at a different depth than the visual representation of the directory level, and at least one of the visual representations of the first and second subdirectories is partially overlapping the visual representation of the directory level to visually indicate that the first and second subdirectories are below the directory level in the file directory hierarchy, and the visual representations of the first and second subdirectory levels are displayed at the same size and the same depth to visually indicate that the first and second subdirectory levels are at the same level in the file directory hierarchy,
where the method is performed by one or more hardware processors.

2. The method of claim 1, where the visual representation of the first or second subdirectory is displayed in the interface at an angle relative to the visual representation of the directory level.

3. The method of claim 1, further comprising:
in response to a selection of the visual representation of the first or second subdirectory:
scaling the visual representation of the selected subdirectory; and
removing the visual representations of the directory level and the unselected subdirectory.

4. The method of claim 1, further comprising:
indicating a current selection of the first or second element in the visual representation of the director level.

5. The method of claim 1, further comprising:
generating text related to the first or second element; and
combining the text and the first or second element for display in the visual representation of the directory level.

6. A apparatus comprising:
one or more processors;
memory coupled to the one or more processors and configured to store instructions, which, when executed by the one or more processors, causes the one or more processors to perform operations comprising:
presenting a visual representation of a directory level of a file directory hierarchy in an interface, the visual representation of the directory level including a first element representing a first subdirectory level of the file directory hierarchy and a second element representing a second subdirectory level of the file directory hierarchy, where the first and second subdirectory levels are at the same level in the file directory hierarchy; and
in response to selection of the first element and then the second element:
displaying visual representations of the first and second subdirectory levels together with a scaled version of the visual representation of the directory level, where the visual representations of the first and second subdirectory levels are displayed at a different size and at a different depth than the visual representation of the directory level, and at least one of the visual representations of the first and second subdirectories is partially overlapping the visual representation of the directory level to visually indicate that the first and second subdirectories are below the directory level in the file directory hierarchy, and the visual representations of the first and second subdirectory levels are displayed at the same size and the same depth to visually indicate that the first and second subdirectory levels are at the same level in the file directory hierarchy.

7. The apparatus of claim 6, where the visual representation of the first or second subdirectory is displayed in the interface at an angle relative to the visual representation of the directory level.

8. The apparatus of claim 6, further comprising:
in response to a selection of the visual representation of the first or second subdirectory:
scaling the visual representation of the selected subdirectory; and
removing the visual representations of the directory level and the unselected subdirectory.

9. The apparatus of claim 6, further comprising:
indicating a current selection of the first or second element in the visual representation of the directory level.

10. The apparatus of claim 6, further comprising:
generating text related to the first or second element; and
combining the text and the first or second element for display in the visual representation of the directory level.

11. A non-transitory, computer-readable storage medium having stored thereon instructions, which, when executed by the one or more processors, causes the one or more processors to perform operations comprising:
presenting a visual representation of a directory level of a file directory hierarchy in an interface, the visual representation of the directory level including a first element representing a first subdirectory level of the file directory hierarchy and a second element representing a second subdirectory level of the file directory hierarchy, where the first and second subdirectory levels are at the same level in the file directory hierarchy; and
in response to selection of the first element and then the second element:
displaying visual representations of the first and second subdirectory levels together with a scaled version of the visual representation of the directory level, where the visual representations of the first and second subdirectory levels are displayed at a different size and at a different depth than the visual representation of the directory level, and at least one of the visual representations of the first and second subdirectories is partially overlapping the visual representation of the directory level to visually indicate that the first and second subdirectories are below the directory level in the file directory hierarchy, and the visual representations of the first and second subdirectory levels are displayed at the same size and the same depth to visually indicate that the first and second subdirectory levels are at the same level in the file directory hierarchy.

12. The non-transitory, computer-readable medium of claim 11, where the visual representation of the first or second subdirectory is displayed in the interface at an angle relative to the visual representation of the directory level.

13. The non-transitory, computer-readable medium of claim 11, further comprising:
    in response to a selection of the visual representation of the first or second subdirectory:
        scaling the visual representation of the selected subdirectory; and
        removing the visual representations of the directory level and the unselected subdirectory.

14. The non-transitory, computer-readable medium of claim 11, further comprising:
    indicating a current selection of the first or second element in the visual representation of the directory level.

15. The non-transitory, computer-readable medium of claim 11, further comprising:
    generating text related to the first or second element; and
    combining the text and the first or second element for display in the visual representation of the directory level.

\* \* \* \* \*